(12) United States Patent
Kim et al.

(10) Patent No.: US 9,165,367 B2
(45) Date of Patent: Oct. 20, 2015

(54) DEPTH ESTIMATION SYSTEM FOR TWO-DIMENSIONAL IMAGES AND METHOD OF OPERATION THEREOF

(75) Inventors: Yeong-Taeg Kim, Irvine, CA (US); Hunsop Hong, Irvine, CA (US)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 691 days.

(21) Appl. No.: 13/109,973

(22) Filed: May 17, 2011

(65) Prior Publication Data

US 2012/0056887 A1  Mar. 8, 2012

Related U.S. Application Data

(60) Provisional application No. 61/379,681, filed on Sep. 2, 2010.

(51) Int. Cl.
*G06T 15/50* (2011.01)
*G06T 7/00* (2006.01)

(52) U.S. Cl.
CPC ............ *G06T 7/0059* (2013.01); *G06T 15/50* (2013.01); *G06T 2207/20068* (2013.01)

(58) Field of Classification Search
CPC  G06T 7/0051; G06T 7/0069; G09G 2380/00; G09G 3/003; H04N 5/23212
See application file for complete search history.

(56) References Cited

U.S. PATENT DOCUMENTS

| 7,262,767 | B2 | 8/2007 | Yamada |
| 2007/0024614 | A1 | 2/2007 | Tam et al. |
| 2008/0303894 | A1* | 12/2008 | Ernst et al. .................... 348/43 |

* cited by examiner

*Primary Examiner* — Edward Martello
(74) *Attorney, Agent, or Firm* — IP Investment Law Group

(57) ABSTRACT

A method of operation of a depth estimation system includes: calculating focus measures for positions on a two-dimensional image; generating a depth map for the two-dimensional image based on fitting the focus measure through a Gaussian function; generating a three-dimensional image from the depth map and the two-dimensional image; and processing the three-dimensional image on a storage unit for displaying on a device.

20 Claims, 3 Drawing Sheets

DEPTH ESTIMATION SYSTEM FOR TWO-DIMENSIONAL IMAGES AND METHOD OF OPERATION THEREOF

CROSS-REFERENCE TO RELATED APPLICATION(S)

This application claims the benefit of U.S. Provisional Patent Application Ser. No. 61/379,681 filed Sep. 2, 2010, and the subject matter thereof is incorporated herein by reference thereto.

TECHNICAL FIELD

The present invention relates generally to an image processing system, and more particularly to a depth estimation system for two-dimensional images.

BACKGROUND ART

Modern consumer and industrial electronics, especially devices such as graphical display systems, televisions, projectors, cellular phones, portable digital assistants, and combination devices, are providing increasing levels of functionality to support modern life including three-dimensional display services. Research and development in the existing technologies can take a myriad of different directions.

As users become more empowered with the growth of three-dimensional display devices, new and old paradigms begin to take advantage of this new device space. There are many technological solutions to take advantage of this new display device opportunity. One existing approach is to display three-dimensional images on consumer, industrial, and mobile electronics such as video projectors, televisions, monitors, gaming systems, or a personal digital assistant (PDA). However, creation of three-dimensional images is time consuming and requires complex efforts.

Thus, a need still remains for a depth estimation system for two-dimensional images to generate three-dimensional images best suited for the circumstance. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a depth estimation system including: calculating focus measures for positions on a two-dimensional image; generating a depth map for the two-dimensional image based on fitting the focus measure through a Gaussian function; generating a three-dimensional image from the depth map and the two-dimensional image; and processing the three-dimensional image on a storage unit for displaying on a device.

The present invention provides a depth estimation system including: a focus calculator, for calculating focus measures for positions on a two-dimensional image; a Gaussian calculator, coupled to the focus calculator, for fitting the focus measures to a Gaussian function to generate a depth map of the two-dimensional image; a depth generator, coupled to the Gaussian calculator, for generating a three-dimensional image from the depth map and the two-dimensional image; and a save module, coupled to the depth generator, for processing the three-dimensional image on a storage unit for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
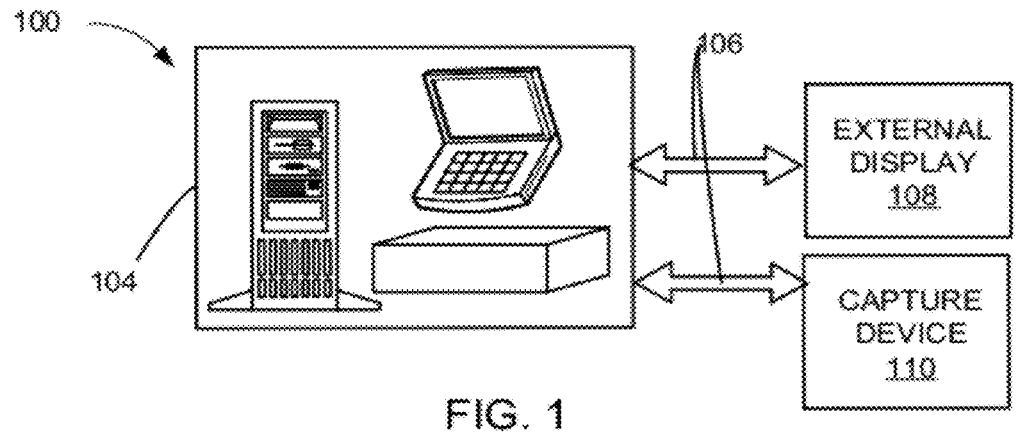
FIG. 1 is a depth estimation system for two-dimensional images in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part.

The term "module" referred to herein include software, hardware, or a combination thereof. For example, the software can be machine code, firmware, embedded code, and application software. Also for example, the hardware can be circuitry, processor, computer, integrated circuit, integrated circuit cores, a camera, a camcorder, a microelectromechanical system (MEMS), passive devices, or a combination thereof.

Referring now to FIG. 1, therein is shown a depth estimation system 100 for two-dimensional images in an embodiment of the present invention. The depth estimation system 100 can include a device 104. The device 104 is defined as an electronic machine capable of storing and computing digital data. For example, the device 104 can be of any of a variety of mobile devices, such as a cellular phone, personal digital assistant, a notebook computer, a tablet PC, a tabletop computer, a smart surface, or other multi-functional mobile communication or entertainment device.

In another example, the device 104 can be an electronic machine, such as a camera, a mainframe, a server, a cluster server, rack mounted server, or a blade server, or as more specific examples, an IBM System z10™ Business Class mainframe or a HP ProLiant ML™ server. Yet another example, the device 104 can be a specialized machine, such as a portable computing device, a digital camera, a thin client, a notebook, a netbook, a smartphone, personal digital assistant, or a cellular phone, and as specific examples, an Apple iPad™, an Apple iPhone™, Palm Centro™, or Moto Q Global™.

The device 104 can be a standalone device, or can be incorporated with a larger electronic system, for example a home theatre system, a personal computer, or a vehicle. The device 104 can couple to a communication path 106 to communicate with external devices, such as an external display 108 and a capture device 110.

The communication path 106 is defined as an interconnection between electronic terminals. The communication path 106 can be a variety of networks. For example, the communication path 106 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 106. Ethernet, digital subscriber line (DSL), fiber to the home (FTTH), and plain old telephone service (POTS) are examples of wired communication that can be included in the communication path 106.

Further, the communication path 106 can traverse a number of network topologies and distances. For example, the communication path 104 can include direct connection, personal area network (PAN), local area network (LAN), metropolitan area network (MAN), wide area network (WAN) or any combination thereof.

The external display 108 is defined as a device for displaying stored images of the depth estimation system 100. The external display 108 can be, for example, a 3D TV, a pair of goggles, an LCD screen, or a touch screen. The external display 108 can have observable depths of images and motion images, and capable of displaying three-dimensionally. The capture device 110 is defined as a device for recording images for the depth estimation system 100. The capture device 110 can be, for example, a digital camera, a camcorder, a webcam, or an array of sensors.

For illustrative purposes, the depth estimation system 100 is described with the device 104 as a mobile computing device, although it is understood that the device 104 can be different types of computing devices. For example, the device 104 can also be a non-mobile computing device, such as a server, a server farm, or a desktop computer.

Figure 2:
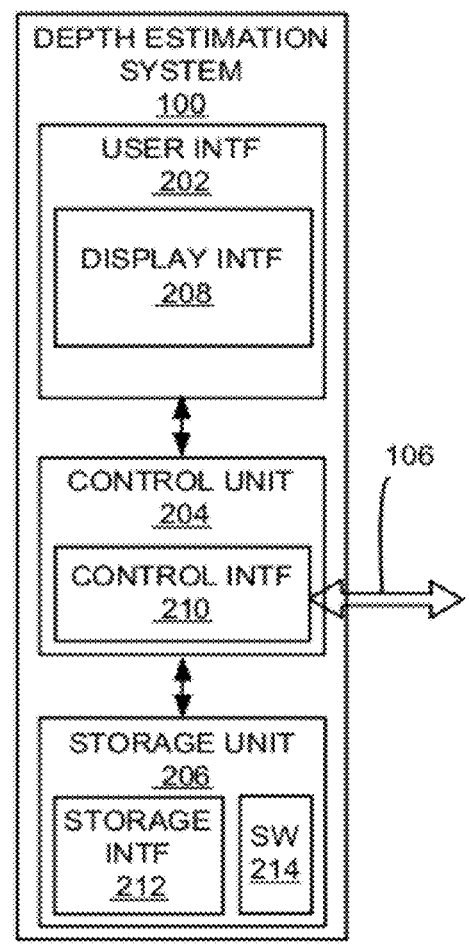
FIG. 2 is an exemplary block diagram of the depth estimation system of FIG. 1.

Referring now to FIG. 2, therein is shown an exemplary block diagram of the depth estimation system 100 of FIG. 1. The depth estimation system 100 can include a user interface 202, a control unit 204, and a storage unit 206. The user interface 202 can include a display interface 208. The control unit 204 can include a control interface 210. The storage unit 206 can include a storage interface 212.

The user interface 202 allows a user to interface and interact with the depth estimation system 100. The user interface 202 can include an input device and an output device. Examples of the input device of the user interface 202 can include a keypad, a touchpad, soft-keys, a keyboard, a microphone, a touch pad, a camera, a webcam or a combination thereof to provide data and communication inputs.

The user interface 202 can include the display interface 208. Examples of the output device of the user interface 202 can include the display interface 208. The display interface 208 can include a display, a projector, a video screen, a speaker, or a combination thereof. The display interface 208 can also be a touch screen, such that inputs can be received from the display interface 208.

The control unit 204 can execute a software 214 to provide the intelligence of the depth estimation system 100. The control unit 204 can operate the user interface 202 to display information generated by the depth estimation system 100. The control unit 204 can also execute the software 214 for the other functions of the depth estimation system 100, including receiving image information from the capturing device 102 of FIG. 1. The control unit 204 can further execute the software 214 for adjusting and updating the image information to display on or through the display interface 208.

The control unit 204 can be implemented in a number of different manners. For example, the control unit 204 can be a processor, an embedded processor, a microprocessor, a hardware control logic, a hardware finite state machine, a digital signal processor, or a combination thereof.

The control unit 204 can include the control interface 210. The control interface 210 can be used for communication between the control unit 204 and other functional units in the depth estimation system 100. The control interface 210 can also be used for communication that is external to the depth estimation system 100.

The control interface 210 can receive information from the other functional units or from external sources, or can transmit information to the other functional units or to external destinations. The external sources and the external destinations refer to sources and destinations external to the depth estimation system 100.

The control interface 210 can be implemented in different ways and can include different implementations depending on which functional units or external units are interfacing with the control interface 210. For example, the control interface 210 can be implemented with a pressure sensor, an inertial sensor, a microelectromechanical system, optical circuitry, waveguides, wireless circuitry, wireline circuitry, or a combination thereof.

The storage unit 206 can store the software 214. The storage unit 206 can also store the relevant information, such as advertisements, preferred settings, operating system, previous adjustments and updates, or a combination thereof.

The storage unit 206 can be a volatile memory, a nonvolatile memory, an internal memory, an external memory, or a combination thereof. For example, the storage unit 206 can be a nonvolatile storage such as non-volatile random access memory, Flash memory, disk storage, or a volatile storage such as static random access memory.

The storage unit 206 can include the storage interface 212. The storage interface 212 can be used for communication between the control unit 204 and other functional units in the depth estimation system 100. The storage interface 212 can also be used for communication that is external to the depth estimation system 100.

The storage interface 212 can receive information from the other functional units or from external sources, or can transmit information to the other functional units or to external destinations. The external sources and the external destinations referred to as sources and destinations external to the depth estimation system 100.

The storage interface 212 can be implemented differently depending on which functional units or external units are being interfaced with the storage unit 206. The storage interface 212 can be implemented with technologies and techniques similar to the implementation of the control interface 210.

Figure 3:
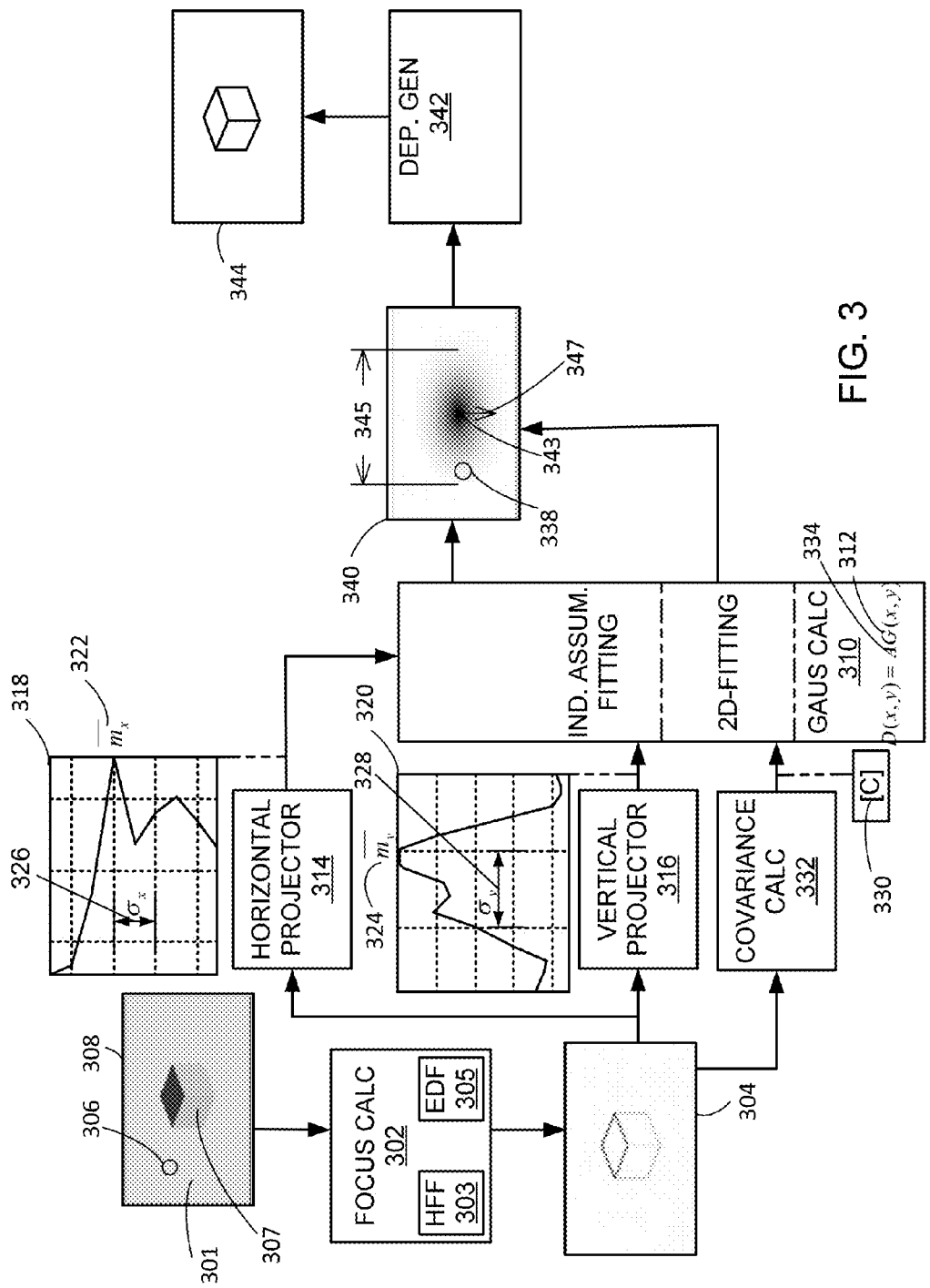
FIG. 3 is a functional block diagram providing an example of an operation of the depth estimation system of FIG. 1.

Referring now to FIG. 3, therein is shown a functional block diagram providing an example of an operation of the depth estimation system 100 of FIG. 1. The depth estimation system 100 can include a focus calculator 302. The focus calculator 302 is defined as a module or a functional unit of the depth estimation system 100 for determining a quantitative measure of image clarity for pixels or positions on an image. The focus calculator 302, for example, can generate focus measures 304 for positions 306 on a two-dimensional image 308 of a background scene 301 including a center object 307. The center object 307 includes depiction of object located about a center portion of the two-dimensional image 308. The focus measures 304 are defined as magnitudes determined from a systematic way to assign each image point a quantifiable magnitude of clarity and lack of blurriness. The focus measures 304 can be measures of how closely light rays originating from a surface point of an object converge to the image point. The center object 307 is clear with lack of blurriness compared to the rest of the background scene 301 with the center object 307 being in focus for the two-dimensional image 308. The positions 306 are defined as specific pixels within an image. For example, the positions 306 can be represented by coordinates along an x-axis and a y-axis for the two-dimensional image 308 including coordinates of the pixels corresponding to the center object 307 and the background scene 301.

The focus calculator 302 can determine the focus measures 304 by, for example, a high frequency filter 303 measuring magnitudes of high frequency changes of pixel characteristics at or near image pixels, such as changes in at least: color, intensity, texture, tone, saturation, or a combination thereof. The focus calculator 302 can also determine the focus measures 304 by, for example, an edge detection function 305, a function for quantifying sharp changes in image brightness by measuring the change in brightness near an image pixel. The result of running the two-dimensional image 308 through the focus calculator 302 is the focus measures 304 corresponding to each of the positions 306 on the two-dimensional image 308.

As a specific example, the method of generating the focus measures 304 for the positions 306 on the two-dimensional image 308 can be expressed by the following equation:

$$H(x,y)=F(x,y) \cdot I(x,y) \qquad \text{Eq. 1}$$

F(x,y) describes a focus measure function for determining the focus measure of a particular pixel or pixel region. The symbol "·" denotes a general operation between functions such as a convolution operation. I(x,y) describes a matrix or a function representing the two-dimensional image 308 in terms of its color intensity for each of the positions 306. H(x,y) describes a matrix or a function representing the focus measures 304 as a function of positions on the two-dimensional image 308, such as x and y coordinates.

It has been discovered calculating the focus measures 304 for the positions 306 on the two-dimensional image 308 provides the depth estimation system 100 with accurate depth estimation. The focus calculator 302 serves to accurately predict the depth of the center object 307 in a two-dimensional picture by basing such prediction on the focus measures 304 of the positions 306 of the two-dimensional image 308. It is unexpectedly found that the focus measures of a two-dimensional picture are correlated with the depths of objects in the picture when the picture was taken. Calculating the focus measures 304 for the two-dimensional image 308 thereby provides a more accurate depth estimation.

The depth estimation system 100 can further include a Gaussian calculator 310. The Gaussian calculator 310 is defined as a module or a functional unit of the depth estimation system 100 for fitting focus measures to one or more Gaussian functions to generate at least a Gaussian function 312. The Gaussian calculator 310, for example, can fit one or more Gaussian functions to the focus measures 304, where the combined resulting one or more Gaussian functions are assigned as the Gaussian function 312 with estimated depths corresponding to the positions 306 on the two-dimensional image 308.

In one specific example, Gaussian fitting can be accomplished by calculating the means and standard deviations of the focus measures 304 with respect to an x-axis and a y-axis, and inserting those values to the Gaussian function 312. In the specific example for ease of hardware implementation, the Gaussian calculator 310 can assume that the distribution of the focus measures 304 for each axis is independent. Thus, the vertical and the horizontal components of the focus measures 304 can be separated and projected on to each axis, such as the x-axis and the y-axis.

The depth estimation system 100 can include a horizontal projector 314 and a vertical projector 316. The focus measures 304 are calculated for the positions 306, where the positions 306 have a horizontal component and a vertical component. Hence, the focus measures 304 are values on the positions 306 on a two-dimensional plane, capable of having horizontal and vertical projections. For example, a horizontal projection 318 and a vertical projection 320 of the focus measures 304 can first be calculated by the following equation:

$$H_H(y)=\Sigma_i H(i,y) \qquad \text{Eq. 2}$$

$$H_V(x)=\Sigma_j H(x,j) \qquad \text{Eq. 3}$$

Here, $H_V(x)$ represents the vertical projection 320. The vertical projection 320 is defined as a summation of all vertical components of the focus measures 304, such as the focus measures 304 represented by H(x,y) in Eq. 1. Here, $H_H(y)$ represents the horizontal projection 318. The horizontal projection 318 is defined as a summation of all horizontal components of the focus measures 304.

The horizontal projection 318 can be generated from the horizontal projector 314. The horizontal projector 314 is defined as a module or a functional unit of the depth estimation system 100 for generating a horizontal projection by summing values of every row of a matrix, such as the focus measures 304. The vertical projection 320 can be generated from the vertical projector 316. The vertical projector 316 is defined as a module or a functional unit of the depth estimation system 100 for generating a vertical projection by summing values of every column of a matrix, such as the focus measures 304.

The means and standard deviations can be attained using the projected focus measure in Eq. 1. The most convenient ways to estimate an x-mean 322, a y-mean 324, an x-standard deviation 326, and a y-standard deviation 328 corresponding to $\overline{m_x}$, $\overline{m_y}$, $\sigma_x$, and $\sigma_y$, respectively, are:

$$\overline{m_x} = \frac{1}{\sum_x H_V(x)} \sum_x x H_V(x), \qquad \text{Eq. 4}$$

$$\sigma_x = \frac{1}{\sum_x H_V(x)} \sum_x \{H_V(x) - \overline{m_x}\}^2$$

$$\overline{m_y} = \frac{1}{\sum\limits_y H_H(y)} \sum_y y H_H(y), \qquad \text{Eq. 5}$$

$$\sigma_y = \frac{1}{\sum\limits_y H_H(y)} \sum_y \{H_H(y) - \overline{m_y}\}^2$$

In another example without assumption of independence along horizontal and vertical components, the means $\overline{m_x}$, $\overline{m_y}$, and a covariance matrix 330, expressed as C, can be expressed as:

$$\overline{m_x} = \frac{1}{\sum\limits_{x,y} H(x,y)} \sum_{x,y} x H(x,y), \qquad \text{Eq. 6}$$

$$\overline{m_y} = \frac{1}{\sum\limits_{x,y} H(x,y)} \sum_{x,y} y H(x,y)$$

$$C = \sum_{x,y} \{H(x,y) - \overline{m}\}\{H(x,y) - \overline{m}\}^T \qquad \text{Eq. 7}$$

Here, T stands for the transpose operation of a matrix. The depth estimation system 100 can include a covariance calculator 332. The covariance matrix 330 of the focus measures 304 can be calculated by the covariance calculator 332. The covariance calculator 332 is defined as a module or a functional unit of the depth estimation system 100 for calculating the covariance matrix 330 of the focus measures 304 without assuming independent horizontal and vertical components. The covariance calculator 332 can calculate the covariance matrix 330 by Eq. 7.

According to the first example assuming independence, the Gaussian function 312, G(x,y), according to the x-mean 322, the y-mean 324, the x-standard deviation 326 and the y-standard deviation 328 can be expressed as:

$$G(x,y) = \frac{1}{2\pi\sigma_x\sigma_y} e^{-\frac{(x-m_x)^2}{2\sigma_x^2} - \frac{(x-m_y)^2}{2\sigma_y^2}} \qquad \text{Eq. 8}$$

Without independent assumption, the Gaussian function 312, G(x,y), can be expressed as:

$$G(x,y) = \frac{1}{2\pi|C|^{1/2}} e^{-\frac{1}{2}(x-m_x)^T C^{-1}(y-m_y)} \qquad \text{Eq. 9}$$

In both examples, the depth D(x,y) at the point of (x,y) can be written as $$D(x,y) = A G(x,y), \qquad \text{Eq. 10}$$

Here, A represents a gain 334, which is defined as a multiplier specifying some proper gain required to turn the fitted Gaussian function G(x,y) into the estimated depth function D(x,y). The gain 334 can be a constant, or as a function of the positions 306 on the two-dimensional image 308. The gain 334 can be based on user preference, machine learning, or other machine optimization. The estimated depth function based on the fitted Gaussian function describes depth or distance from an original capturing device according to the mean, frequency, or spread for pixel representation of items or features captured in the two-dimensional image 308, such as through the x-mean 322, the y-mean 324, the x-standard deviation 326, the y-standard deviation 328, or a combination thereof.

The Gaussian calculator 310 can initially set pixel depths 338 and a depth map 340 to be the Gaussian function 312. The pixel depths are defined as calculated estimations of how far away positions on the two-dimensional image 308 are from the original capturing device. The depth map 340 is defined as a table for each of the positions 306 having values in each cell of the table corresponding to the pixel depths 338. The depth map 340 can express the table of the pixel depths 338 as a matrix or a rectangular array of quantities. The depth map 340 describes the pixel depths 338 for pixels corresponding to the center object 307 closest to the original capturing device compared to items or features in the background scene 301. The depth map 340 includes an object center location 343 representing clearest or nearest point of the center object 307 from the original capturing device, a focus area 345 representing a region in the image 308 corresponding to clarity or distance from the original capturing device, and a segment order 347 representing a relative arrangement according to an order. The object center location 343 is depicted as darkest location in the depth map 340 and the segment order 347 is depicted as a pattern with the pixels growing lighter moving away from the object center location 343.

In another example, the Gaussian calculator 310 can also fit a multiple number of Gaussian functions, such as a Gaussian mixture, to the focus measures 304. It has been unexpectedly found that utilizing a Gaussian mixture can effectively give accurate depth estimation of a two-dimensional picture where there are multiple objects of interest in focus. Parameters of the Gaussian mixture can be estimated by mechanisms such as expectation-maximization mechanism, Markov chain Monte Carlo mechanism, or moment matching mechanisms. The combined Gaussian mixture can be set as the depth map 340.

The depth estimation system 100 can include a depth generator 342. The depth generator 342 is defined as a module or a functional unit of the depth estimation system 100 for modifying the pixel depths 338 corresponding to the positions 306 on the two-dimensional image 308 to generate a three-dimensional image 344. The depth generator can use the depth map 340 with the pixel depths 338 corresponding to the positions 306 on the two-dimensional image 308 to generate the three-dimensional image 344. The depth generator 342 can assign the pixel depths 338 based on Eq. 10, where the current depth map 340, initially set as the Gaussian function 312, multiplied by the gain 334 would be the pixel depths 338 of the three-dimensional image 344. The depth generator 342 can modify the pixel depths 338 based on giving more depth to the center object 307 corresponding to the focus area 345 or based on ordering. The depth generator 342 gives more depth with local separation by taking local mean of the pixel depths set as the Gaussian function 312 only with the support of same segment with the object center location 343 using the focus measures 304 corresponding to segments of the given image. The depth generator 342 alternatives gives more depth by ordering and arranging the focus measures 304 corresponding to the segments according to the mean for the segment order 347, and by adjusting depth values proportional to the segment order 347 with the object center location 343 at beginning or end of the segment order 347.

Alternatively, the depth generator 342 can invert the depth map 340 to generate the three-dimensional image 344 when objects in focus are actually background objects instead of foreground objects. The depth generator 342 can also invert the depth map 340 multiplied by the gain 334 to generate the three-dimensional image 344.

It has been discovered generating the depth map 340 for the two-dimensional image 308 based on fitting the focus measure 304 through the Gaussian function 312 provides the depth estimation system 100 with a smoother depth estimation having less 3D visual defects. It has been unexpectedly found that fitting the focus measures 304 to a Gaussian distribution allows the pixel depths 338 estimated by the Gaussian calculator 310 from the focus measures 304 to have less sudden jumps in values without sacrificing the accuracy of the depth estimation. Having less sudden jumps in the pixel depths 338 provides less visual defects when the pixel depths 338 are used to generate the three-dimensional image 344. Fitting the focus measures 304 through the Gaussian function 312 thereby provides a smoother depth estimation having less 3D visual defects.

Figure 4:
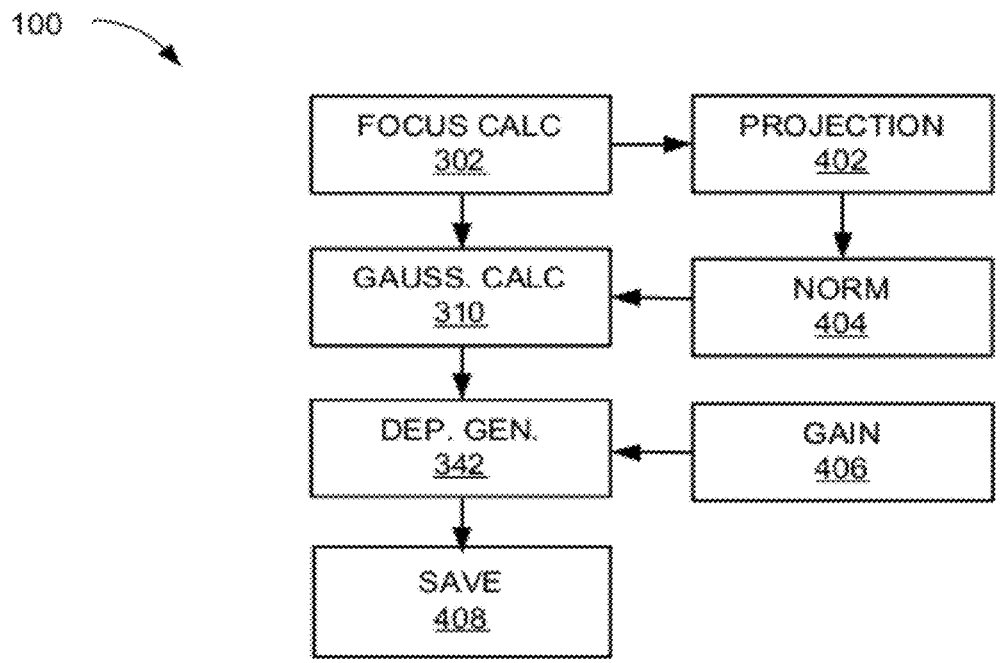
FIG. 4 is a control flow of the depth estimation system.

Referring now to FIG. 4, therein is shown a control flow of the depth estimation system 100. The depth estimation system 100 can include the focus calculator 302 of FIG. 3. The focus calculator 302 can be a module of the depth estimation system 100 for determining the clarity of an image or portions of the image by calculating focus measure values for positions on an image. The focus calculator 302 can function to calculate the focus measures 304 of FIG. 3 for the positions 306 of FIG. 3 on the two-dimensional image 308 of FIG. 3. For example, the focus calculator 302 can function to calculate the focus measures 304 with the high frequency filter 303 of FIG. 3. The focus calculator 302 can also function to calculate the focus measures 304 with an edge detection function 305 of FIG. 3.

For another example, the focus calculator 302 can function to calculate the focus measures 304 by measuring a first derivative of the intensity, brightness, saturation, tone, or color between the positions 306 on the two-dimensional image 308. The focus calculator 302 can further function to calculate the focus measures 304 by measuring a second derivative of the intensity, brightness, saturation, tone, or color between the positions 306 on the two-dimensional image 308.

The depth estimation system 100 can include a projection module 402. The projection module 402 is a module of the depth estimation system 100 for calculating an x-axis projection and a y-axis projection of the focus measure values. The projection module 402 can include the horizontal projector 314 of FIG. 3 and the vertical projector 316 of FIG. 3. The projection module 402 can function to calculate the horizontal projection 318 of FIG. 3 and the vertical projection 320 of FIG. 3 of the focus measures 304, separately in two different method steps, or in one step. For example, the projection module 402 can calculate the projections with Eqs. 2 and 3. The projection module 402 can be coupled to the focus calculator 302 and create the projections based on the focus measures 304 received from the focus calculator 302.

The depth estimation system 100 can include a normalization module 404. The normalization module 404 is defined as a module or a functional unit of the depth estimation system 100 for calculating a mean and a standard deviation for distributions of values, such as from each of the projections from the projection module 402. The normalization module 404 can include the covariance calculator 332 of FIG. 3. The normalization module 404 can function to calculate the x-mean 322 of FIG. 3 and the x-standard deviation 326 of FIG. 3 from the horizontal projection 318 and the y-mean 324 of FIG. 3 and the y-standard deviation 328 of FIG. 3 from the vertical projection 320. For example, the normalization module 404 can calculate the mean and the standard deviation of each of the projections with Eqs. 4 and 5. The normalization module 404 can be coupled to the projection module 402.

The depth estimation system 100 can include the Gaussian calculator 310 of FIG. 3. The Gaussian calculator 310 can function to generate the depth map 340 of FIG. 3 for the two-dimensional image 308 based on fitting the focus measure 304 through the Gaussian function 312 of FIG. 3. The Gaussian calculator 310 can be coupled to the focus calculator 302 and receive the focus measures 304 from the focus calculator 302.

The Gaussian calculator 310 can also be coupled to the normalization module 404. For example, the Gaussian calculator 310 can function to generate the depth map 340 for the two-dimensional image 308 based on fitting the focus measures 304 to the Gaussian function 312 based on the x-mean 322, the y-mean 324, the x-standard deviation 326 and the y-standard deviation 328 from the normalization module 404, such as by the equation expressed in Eq. 8. The x-mean 322, the y-mean 324, the x-standard deviation 326 and the y-standard deviation 328 are calculated from the horizontal projection 318 and the vertical projection 320. The x-mean 322 is defined as a position along the x-axis representing the weighted average of the horizontal projection 318. The y-mean 324 is defined as a position along the y-axis representing the weighted average of the vertical projection 320. The x-standard deviation 326 and the y-standard deviation 328 are measures of variability as defined by Eqs. 4 and 5.

For another example, the Gaussian calculator 310 can also function to generate the depth map 340 of the two-dimensional image 308 based on fitting the focus measures 304 to more than one instances of the Gaussian function 312. The more than one instances of the Gaussian function 312 can be estimated by expectation-maximization algorithms.

The depth estimation system 100 can include a gain module 406. The gain module 406 is defined as a module or a functional unit of the depth estimation system 100 for calculating a multiplier, such as the gain 334, for determining the actual depth value of a pixel from a corresponding location on the depth map 340. The gain module 406 can function to calculate the gain 334 based on at least: pre-set preference, a normalized average of the focus measures 304, experimentation, or any combination thereof.

The depth estimation system 100 can include the depth generator 342 of FIG. 3. The depth generator 342 can function to generate a three-dimensional image with depth values based on a depth map. The depth generator 342 can function to generate the three-dimensional image 344 of FIG. 3 from the depth map 340 and the two-dimensional image 308. For example, the depth generator 342 can function to generate the three-dimensional image 344 from the depth map 340 multiplied by the gain 334 of FIG. 3 as shown in Eq. 10 and the two-dimensional image 308.

The depth generator 342 can be coupled to the Gaussian calculator 310 and receive the Gaussian function 312 and the depth map 340 from the Gaussian calculator 310 as the basis of building the three-dimensional image 344. The depth generator 342 can also be coupled to the gain module 406 and receive the gain 334 to generate the pixel depth 338 of FIG. 3 of the three-dimensional image 344 as shown in Eq. 10.

For another example, the depth generator 342 can also function to generate the three-dimensional image 344 by inverting the depth map 340. This has been discovered to be useful in situations where the capture device 110 of FIG. 1 is focused on the background object(s) instead of foreground object(s), making depth inversely proportional to focus measures.

The depth estimation system 100 can include a save module 408. The save module 408 is defined as a module or a functional unit of the depth estimation system 100 for processing a three-dimensional image based on a two-dimensional image on a non-transient storage unit for displaying the three-dimensional image on a display device capable of displaying three-dimensionally. The save module 408 can function to process the three-dimensional image 344 on the storage unit 206 of FIG. 2 for displaying on the external display 108 of FIG. 1. The save module 408 can be coupled to the depth generator 342 and receive the three-dimensional image 344 from the depth generator 342 for storing and displaying.

For example, the save module 408 can process the three-dimensional image 344 for displaying on the external display 108 having observable depths of image. In another example, the save module 408 can process the three-dimensional image 344 on the storage unit 206 for displaying the three-dimensional image 344 at different viewing angles. In yet another example, the save module 408 can process the three-dimensional image 344 on the storage unit 206 for displaying an interaction of the three-dimensional image 344 with other three-dimensional objects or other instances of the three-dimensional image 344.

The software 214 of FIG. 2 can operate the depth estimation system 100. For example, the software 214 can include the focus calculator 302, the Gaussian calculator 310, the depth generator 342, the save module 408, the projection module 402, the normalization module 404, and the gain module 406.

The control unit 204 of FIG. 2 can execute the software 214 for the focus calculator 302 to calculate the focus measures 304 for the positions 306 on the two-dimensional image 308. The control unit 204 can execute the software 214 for the Gaussian calculator 310 to fit the focus measures 304 to the Gaussian function 312 to generate the depth map 340 of the two-dimensional image 308. The control unit 204 can execute the software 214 for the depth generator 342 to generate the three-dimensional image 344 from the depth map 340 and the two-dimensional image 308.

The control unit 204 can execute the software 214 for the save module 408 to store the three-dimensional image 344 on the storage unit 206 for display. The control unit 204 can execute the software 214 for the projection module 402 to calculate the horizontal projection 318 and the vertical projection 320 of the focus measures 304. The control unit 204 can execute the software 214 for the normalization module 404 to calculate the x-mean 322 and the x-standard deviation 326 from the horizontal projection 318 and the y-mean 324 and the y-standard deviation 328 from the vertical projection 320. The control unit 204 can also execute the software 214 for the gain module 406 to calculate the gain 334 based on at least: pre-set preference, a normalized average of the focus measures 304, experimentation, or any combination thereof.

The control unit 204 can execute the display interface 208 of FIG. 2 to display the two-dimensional image 308 or the three-dimensional image 344.

The software 214 can include the focus calculator 302. Based on the size of the storage unit 206 of FIG. 2, the software 214 can include additional modules of the depth estimation system 100. The control unit 204 can execute the modules partitioned on the software 214 as previously described.

For example, the user interface 202 of FIG. 2 can receive the gain 334 from the user, the depth estimation system 100, or a combination thereof. The control unit 204 can operate the communication path 106 of FIG. 1 to send the three-dimensional image 344 to another device for display.

The save module 408 can process and store the three-dimensional image 344 on the storage unit 206. The save module 408 can also store the two-dimensional image 308 and the depth map 340 on the storage unit 206.

The depth estimation system 100 can also be implemented as additional functional units in the device 104 or modification of existing functional units in the device 104. For example, modules in FIG. 5, such as the focus calculator 302, can be additional functional units in the device 104. The depth estimation system 100 describes the module functions or order as an example. The modules can be partitioned differently. For example, the focus calculator 302 and the Gaussian calculator 310 can be combined. Each of the modules can operate individually and independently of the other modules.

Furthermore, data generated in one module can be used by another module without being directly coupled to each other. For example, the depth generator 342 can receive the two-dimensional image 308 for generating the three-dimensional image 344 from the focus calculator 302. In another example, the gain module 406 can receive the focus measures 304 from the focus calculator 302 in order to generate the gain 334.

Figure 5:
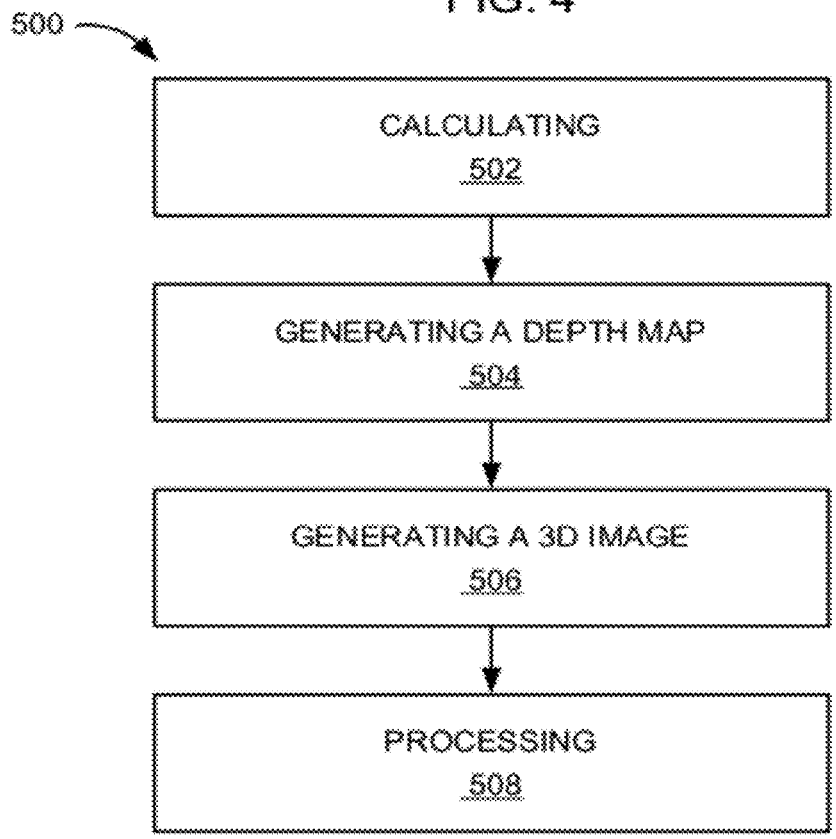
FIG. 5 is a flow chart of a method of operation of the depth estimation system in a further embodiment of the present invention.

Referring now to FIG. 5 therein is shown a flow chart of a method 500 of operation of the depth estimation system 100 in a further embodiment of the present invention. The method 500 includes: calculating focus measures for positions on a two-dimensional image, in a block 502; generating a depth map for the two-dimensional image based on fitting the focus measure through a Gaussian function, in a block 504; generating a three-dimensional image from the depth map and the two-dimensional image, in a block 506; and processing the three-dimensional image on a storage unit for displaying on a device, in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a depth estimation system comprising:
   calculating focus measures for representing edges in a two-dimensional image for depicting a center object;
   generating a depth map with a control unit for the two-dimensional image based on fitting the focus measures through a Gaussian function, the depth map including an object center location corresponding to a position within the two-dimensional image for estimating a location of the center object closest to an original capturing device; and generating a three-dimensional image based on the depth map and the object center location from the two-dimensional image.

2. The method as claimed in claim 1 further comprising:
calculating a horizontal projection of the focus measures;
calculating a vertical projection of the focus measures;
calculating an x-mean and an x-standard deviation from the horizontal projection;
calculating a y-mean and a y-standard deviation from the vertical projection; and
wherein:
generating the depth map includes generating the depth map for the two-dimensional image based on fitting the focus measures through the Gaussian function having the x-mean, the y-mean, the x-standard deviation and the y-standard deviation.

3. The method as claimed in claim 1 wherein calculating the focus measures for the positions on the two-dimensional image includes calculating the focus measures with a high frequency filter.

4. The method as claimed in claim 1 wherein calculating the focus measures for the positions on the two-dimensional image includes calculating the focus measures with an edge detection function.

5. The method as claimed in claim 1 wherein calculating the focus measures for the positions on the two-dimensional image includes calculating the focus measures by measuring a derivative of intensity, brightness, saturation, tone or color between positions on the two-dimensional image.

6. A method of operation of a depth estimation system comprising:
calculating focus measures for representing edges in a two-dimensional image for depicting a center object;
generating a depth map with a control unit for the two-dimensional image based on fitting the focus measures through a Gaussian function derived from a covariance matrix of the focus measures, the depth map including an object center location corresponding to a position within the two-dimensional image for estimating a location of the center object closest to an original capturing device; and
generating a three-dimensional image based on the depth map and the object center location from the two-dimensional image.

7. The method as claimed in claim 6 wherein calculating the focus measures for the positions on the two-dimensional image includes calculating the focus measures by measuring a second derivative of intensity, brightness, saturation, tone or color between positions on the two-dimensional image.

8. The method as claimed in claim 6 wherein generating the depth map includes generating the depth map for the two-dimensional image based on fitting the focus measures through more than one instances of the Gaussian function.

9. The method as claimed in claim 6 further comprising:
calculating a gain based on at least: pre-set preference, a normalized average of the focus measures, experimentation, or any combination thereof; and
wherein:
generating the three-dimensional image includes generating the three-dimensional image from the depth map multiplied by the gain.

10. The method as claimed in claim 6 wherein generating the three-dimensional image from the depth map includes generating the three-dimensional image by inverting the depth map.

11. A depth estimation system comprising:
a control unit configured to:
calculate focus measures for representing edges in a two-dimensional image for depicting a center object;
generate a depth map for the two-dimensional image based on fitting the focus measures through a Gaussian function, the depth map including an object center location corresponding to a position within the two-dimensional image for estimating a location of the center object closest to an original capturing device;
generate a three-dimensional image based on the depth map and the object center location from the two-dimensional image; and
a storage unit, coupled to the control unit, configured to store the depth map.

12. The system as claimed in claim 11 wherein the control unit is further configured to:
calculate a horizontal projection of the focus measures and for calculating a vertical projection of the focus measures;
calculate an x-mean and an x-standard deviation from the horizontal projection and for calculating a y-mean and a y-standard deviation from the vertical projection; and
generate the depth map for the two-dimensional image based on fitting the focus measures through the Gaussian function having the x-mean, the y-mean, the x-standard deviation and the y-standard deviation.

13. The system as claimed in claim 11 wherein the control unit is configured to calculate the focus measures with a high frequency filter.

14. The system as claimed in claim 11 wherein the control unit is configured to calculate the focus measures with an edge detection function.

15. The system as claimed in claim 11 wherein the control unit is configured to calculate the focus measures by measuring a derivative of intensity, brightness, saturation, tone or color between positions on the two-dimensional image.

16. The system as claimed in claim 11 wherein the control unit is configured to generate the depth map for the two-dimensional image based on fitting the focus measures through the Gaussian function derived from a covariance matrix of the focus measures.

17. The system as claimed in claim 16 wherein the control unit is configured to calculate the focus measures by measuring a second derivative of intensity, brightness, saturation, tone or color between positions on the two-dimensional image.

18. The system as claimed in claim 16 wherein the control unit is configured to generate the depth map for the two-dimensional image based on fitting the focus measures through more than one instances of the Gaussian function.

19. The system as claimed in claim 16 wherein the control unit is configured to:
calculate a gain based on at least: pre-set preference, a normalized average of the focus measures, experimentation, or any combination thereof; and
generate the three-dimensional image from the depth map multiplied by the gain.

20. The system as claimed in claim 16 wherein the control unit is configured to generate the three-dimensional image by inverting the depth map.

* * * * *